United States Patent [19]

Müller et al.

[11] 4,335,489

[45] Jun. 22, 1982

[54] TENSIONING DEVICE, ESPECIALLY FOR LASHING CHAINS

[75] Inventors: Anton Müller, Aalen-Unterkochen; Martin Rauscher; Günter Witzel, both of Aalen, all of Fed. Rep. of Germany

[73] Assignee: Eisen- und Drahtwerk Erlau Aktiengesellschaft, Aalen, Fed. Rep. of Germany

[21] Appl. No.: 106,836

[22] Filed: Dec. 26, 1979

[30] Foreign Application Priority Data

Dec. 23, 1979 [DE] Fed. Rep. of Germany ....... 2855988

[51] Int. Cl.³ .......................... F16B 7/12; E05C 19/10
[52] U.S. Cl. ..................................... 24/68 CT; 59/93; 292/106; 403/166
[58] Field of Search ............. 24/68 CT; 292/105, 106; 59/93; 152/217, 219, 223; 403/166

[56] References Cited

U.S. PATENT DOCUMENTS

| | | | |
|---|---|---|---|
| 1,039,778 | 10/1912 | Migliavacca | 59/93 |
| 1,247,760 | 11/1917 | Wengraf | 152/219 |
| 1,299,821 | 4/1919 | Carpmill et al. | 403/166 |
| 2,237,597 | 4/1941 | Fisher | 403/166 |
| 2,866,244 | 12/1958 | Cobin | 24/68 CT |
| 3,521,443 | 7/1970 | Dragonuk | 59/93 |
| 3,601,864 | 8/1971 | Roberts | 24/68 CT |
| 3,718,946 | 3/1973 | Lunsford et al. | 24/68 CT |
| 3,829,034 | 8/1974 | Mickelson | 403/166 |
| 3,850,468 | 11/1974 | Hultin | 59/93 |
| 4,142,808 | 3/1979 | Muller et al. | 403/166 |

*Primary Examiner*—Victor N. Sakran
*Attorney, Agent, or Firm*—Becker & Becker, Inc.

[57] ABSTRACT

A tensioning device, especially for lashing chains. The device is provided with two link members, movable with respect to each other and having a releasable latch for receiving chain members. At least one link member has a fork-shape, including two legs or arms projecting to extend freely and parallel to each other while being connected by a transverse piece. The link members are held under tension in the closure position, and at least one link member is movable into a releasing position under the force of the connected tension chain. Two spindles are journalled in a double nut, with each having self-binding left and right threads for movement of the link members. A yoke or bracket bridging a suspension opening formed by a hook can be provided, with the hook being pivotable to serve as a link member. The hook is releasably connected with its free end on the yoke or bracket. The hook may be extended beyond the pivot axis thereof.

28 Claims, 10 Drawing Figures

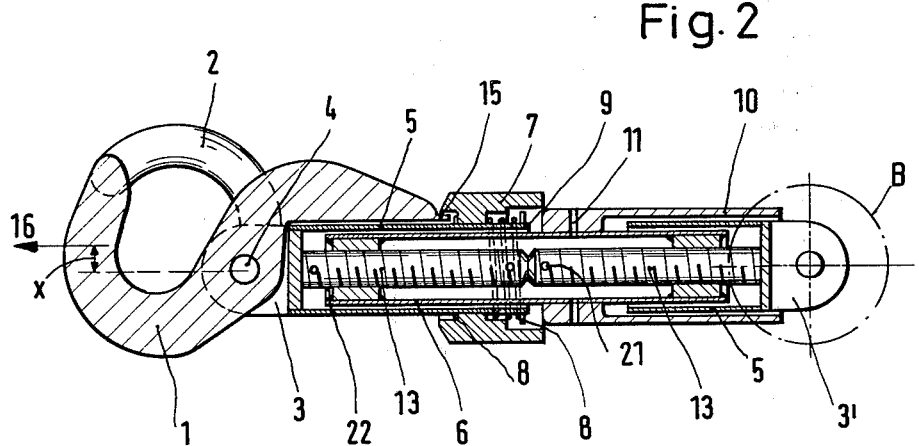
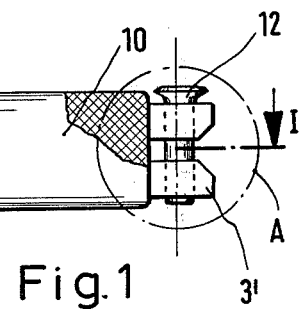
Fig. 2
Fig. 1

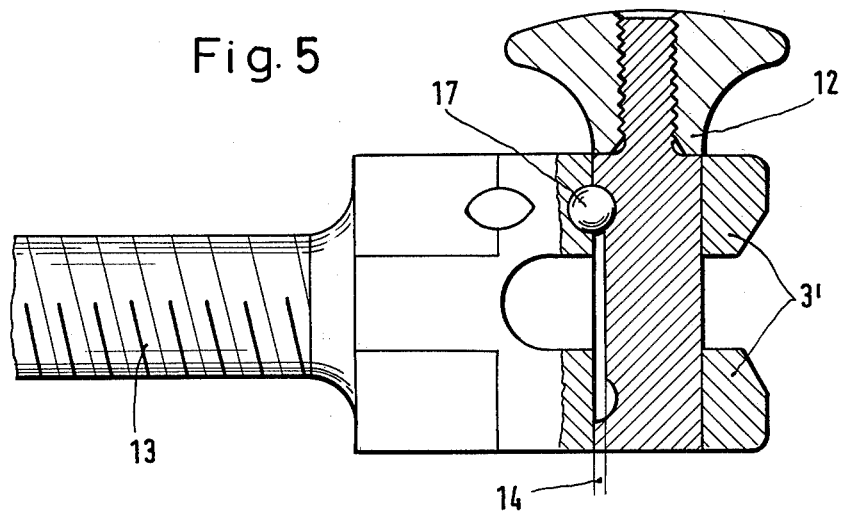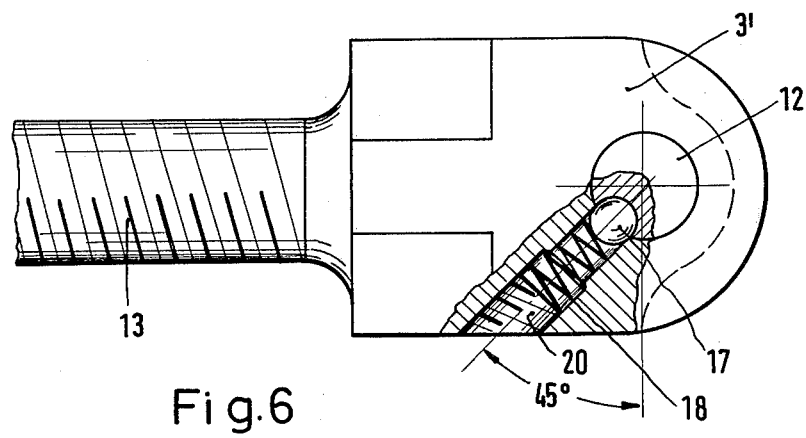

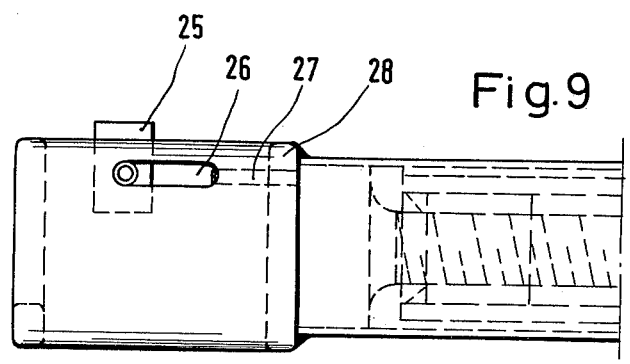
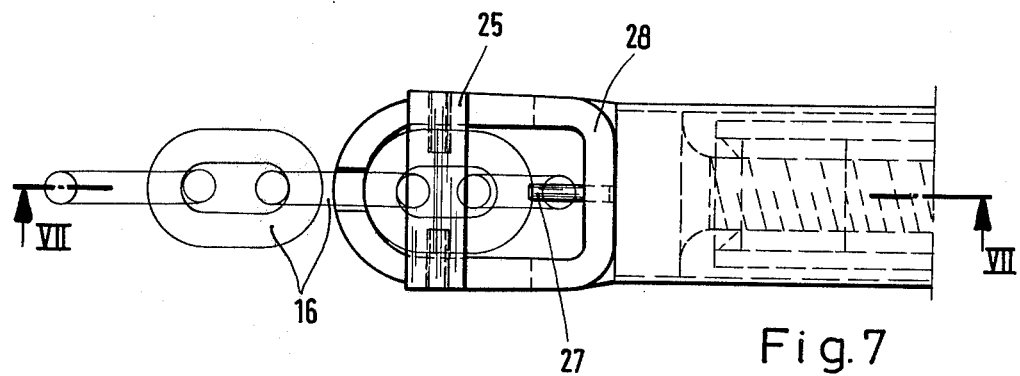

TENSIONING DEVICE, ESPECIALLY FOR LASHING CHAINS

The present invention relates to a tensioning device, especially for chains used for lashing, clamping and seizing purposes. The tensioning device has two link members, movable with respect to each other and having a releasable latch, for receiving chain members. At least one link member has a fork shape and has two freely projecting legs or shanks extending parallel to each other, with a transverse piece interconnecting the same.

U.S. Pat. No. 4,142,808-Müller et al, issued Mar. 6, 1979 and belonging to the Assignee of the present invention, discloses a tensioning device to be used in connection with a releasable latch for tensioning of tire chains. This tensioning device proved successful in practice and in actual installations, even though more than one method step is necessary for latching and unlatching. Accordingly, at least one safety pin must be released and removed, and the chain must be lifted out of the hook-shaped embodiment of a link member. For different situations, for instance in catastrophic cases or situations, this previously known tensioning device is too complex. This is true especially when the tensioning device is to be used for tensioning of lashing or clamping chains for suitable lashing material, rigging, or goods. Situations exist wherein in the shortest time a multiplicity of unlatching is necessary. Additionally, for tensioning the lashing chains accompanied by utilization of the known tensioning devices, likewise for an unlatching, aside from sufficient space, also to a certain extent the utilization of auxiliary means or devices is necessary.

It is therefore an object of the present invention to embody the tensioning device in such a way that it can be satisfactorily connected and also released again without utilization of auxiliary means, even with especially narrow or tight space conditions, with nominal work and time or complexity being involved for connection and disconnection of the chains.

This object, and other objects and advantages of the present invention will appear more clearly from the following specification in connection with the accompanying drawings, in which:

FIG. 1 is a plan view of a tensioning lock with pivotable hooks having a safety sleeve and a fork-shaped link member according to the present invention;

FIG. 2 is a longitudinal section taken along line II—II of FIG. 1;

FIG. 5 is an enlarged illustration of an encircled region A at the right end of FIG. 1, and partially sectioned;

FIG. 6 is an enlarged representation of an encircled region B at a right end of FIG. 2, and partially in section;

FIG. 7 is a plan view of a further variation of the latching with a spring-loaded engagement piece;

FIG. 9 is a side view of the latch variation of FIG. 7; and

Figure 4:
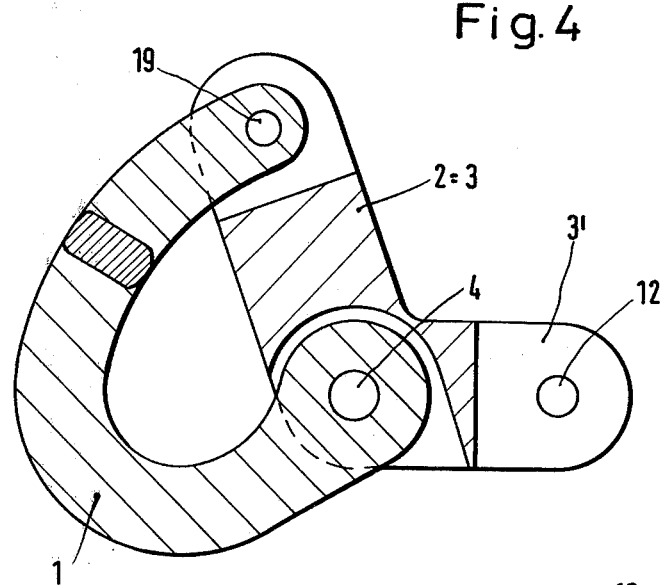
FIG. 4 is a longitudinal section taken along the line IV—IV of FIG. 3.

The tensioning device of the present invention is characterized primarily in that the link members are held in the closure or locking position under tension, and at least one link member, under the force of the connected tensioned chain, being movable into a release position.

Two spindles for movement of the link members may be journalled in a double nut, with each having a self-binding left and right thread. A pivotable hook, serving as a link member, and a bracket or yoke bridging a suspension opening formed by the hook, may be provided for the tensioning device. The hook is releasably connected at its free end to the bracket or yoke. The hook has such a shape that a lever arm is formed between the pivot or turning point of the hook and the point of engagement of the chain in the hook. The hook may be arranged between two freely projecting parallel legs of a fork connection. The yoke or bracket is formed of two parts respectively located in the plane of the legs of the fork connection.

The hook and the bracket or yoke are pivotally journalled about a common axis. The hook and the bracket form a ring in their closed condition. The two legs of the fork connection are angled off at an incline upwardly, and, as a bracket, bridge the suspension opening formed by the hook. The hook may be lengthened or extended beyond the pivot or turning axis. The extended part of the hook is arrestable. The extended part of the hook ends upon the outer wall of the tensioning lock. A slide sleeve is arranged journalled shiftably upon the tensioning lock for arresting the extended part of the hook. The slide sleeve is journalled upon a pressure spring. The slide sleeve, in the arrested condition of the hook, is shifted over the end of the extended part of the hook. The end of the extended part of the hook has a profile or shape over which the correspondingly embodied part of the slide sleeve is catchable or engageable. The transverse piece or web may be formed by a locking bolt which is securely clampable in a fork-shaped link member by one or more balls that have a pressure tensioning thereon. Each ball has a pressure spring therewith that is journalled in a spring guide accessible from the outside. The spring guide is inclined by 45° to the axis of the locking bolt. The diameter of the locking bolt is smaller than the diameter of the opening provided for receiving it. In each leg or arm of the fork-shaped link member, there is arranged a ball subject to pressure-spring tensioning or loading. Centrally there may be arranged a ratchet with a simultaneously built-on shortening loop, noose or lifting eye. A ratchet toggle or crossbar is reversibly arranged. The ratchet toggle or crossbar is provided with embossing. A spring-loaded engagement piece may be associated with one of the link members. The engagement piece is guided freely movable in all directions. The pressure spring of the engagement piece is guided, on one side, on a bolt stud, and on the other side is fastened in a recess in the engagement piece. The bolt stud is fastened on an end termination plate of the tensioning lock.

The present inventive embodiment makes possible a quick and functionally certain latching, tensioning and unlatching of the lashing chain without any need for additional tools. However, under these circumstances, there is also provision made for installation of the tensioning device in those cases where only nominal space is available for turning or rotation of the tensioning lock. The link members open automatically under chain pulling or tensioning after the release of the particular arresting or locking means. All parts are easily accessible and functionally secure so that the present inventive tensioning device is also suitable for use in a catastrophic situation.

Figure 8:
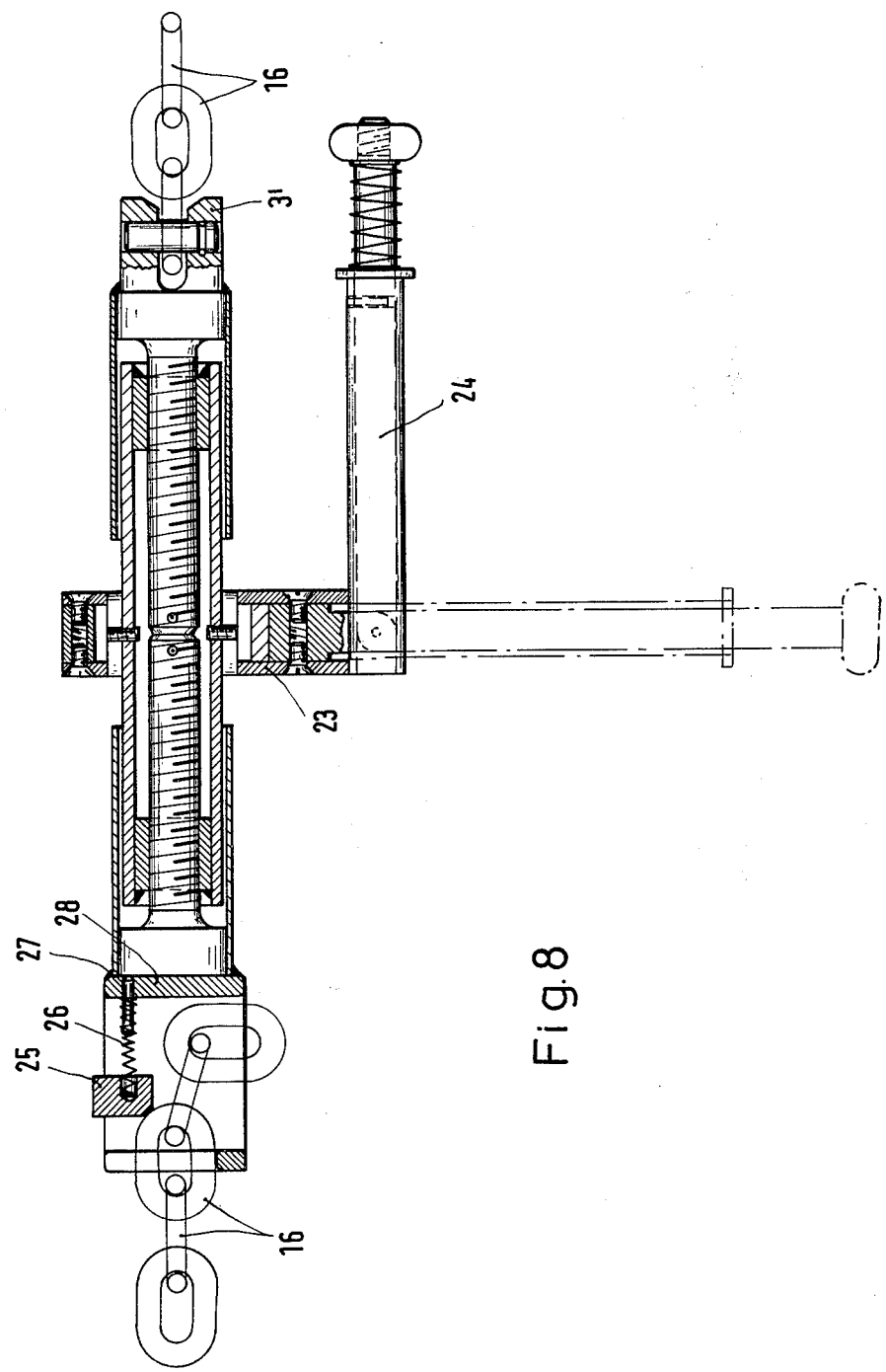
FIG. 8 is a longitudinal section taken along line VIII—VIII of FIG. 7, with an adjoining connected tensioning lock with a ratchet.

Referring now to the drawings in detail, the tensioning lock has two spindles 13, each having a self-binding left and right thread 22, journalled in a double nut 6. A knurled or serrated hand pipe 10 serves for tensioning according to FIGS. 1 and 2, and this hand pipe 10, for example, permits a power or force transfer of approximately 4000 N. For larger preloading forces, a subsequently described arrangement of a ratchet is advantageous in place of a hand pipe 10 (compare also FIG. 8). The turning or rotational movement of the hand pipe 10 can overcome or cross a tensioning path of up to 75 mm to the left and to the right respectively. The hand pipe 10 is rigidly connected by the pin safety device 11 with the double nut 6. The turning or rotational movement for the tensioning of the lock is set forth by a marking "closed" entered in the hand pipe 10. The spindles 13 are secured and protected against dust and dirt by the protective pipe 5. An axial shifting of the parts is precluded by spring securing rings (Seeger rings or circlip lock rings) 8. The reference numeral 21 designates an abutment pin.

Collectively all parts of the tensioning device are interchangeable and, above all, maintenance free. The parts which are directly in engagement with external parts are appropriately heat treated against wear. Even with strong contamination, dust accumulation and the like, the tensioning device is functionally secure. An alloy of 16 Mn Cr 5 is used as a work material.

The inventive tensioning device has a pivotal hook 1 on one end face. The suspension opening formed by this hook 1 is bridged by a yoke or bracket 2. The hook 1 is arranged between two legs or shanks of a fork connection 3 projecting freely and extending parallel to each other, and the hook is pivotally journalled about the pivot or turning axis 4, whereby the pivot or turning axis 4 is formed by a bolt.

The formation of the hook 1 is essential and important. The formation of the hook must be so selected that a lever arm is formed between the pivot or turning axis 4 of the hook 1 and the engagement point of the chain 16 in the hook 1; this means that the chain tension or pulling must engage off-center. Such a formation of the hook 1 contributes to quicker unlatching. After the release of the arresting of the pivotable hook 1, this hook swings through downwardly and immediately releases a chain that was inserted therein. This release of the chain 16 is enhanced by the off-center engagement of the chain tension or pulling in the hook 1. Accordingly, there is made possible a quick and easy unlatching.

The yoke or bracket according to FIGS. 1 and 2 is likewise arranged pivotably about the turning axis 4. However, it can also be rigidly secured. The yoke or bracket 2 is formed by two respective parts which engage against the arms or shanks of the fork connection 3 or are located in the plane of the shanks or legs. The yoke or bracket 2 can be made straight or bent counter to the hook 1. Important herewith is that the particular suspension opening formed by the hook 1 is bridged. In bent condition, the yoke or bracket 2 together with the hook 1 forms a ring (compare FIG. 2).

Figure 3:
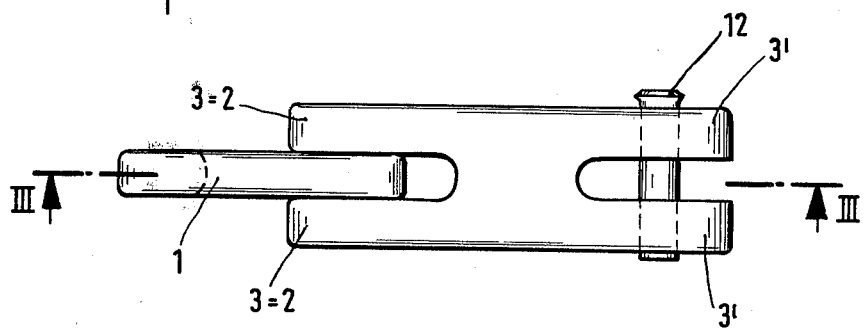
FIG. 3 is a plan view upon a variation of the releasable latch with pivotable hooks.

The two legs or arms of the fork connection 3 extending parallel to each other can be inclined and angled off upwardly according to FIGS. 3 and 4, and can bridge the suspension opening formed by the hook 1. In this case, the angled-off arms or legs serve as a rigid bracket or yoke 2. Under these circumstances, the pivotable hook 1 is releasably connected with its free end on the yoke or bracket 2. Any suitable connection means can serve as a releasable connection between the hook 1 and the bracket or yoke 2. An arresting bolt 19 is utilized in an example that is given. The link members, as recognizable from FIGS. 3 and 4, can be built in or installed alone in the draft system as an independent element without any actual tensioning block.

In accordance with the arrangement of the present invention it is, however, also possible to arrest the pivotable hook without loading of the yoke or bracket 2. For this purpose, the hook 1 is lengthened or extended beyond the turning point 4, whereby the extended part is arrested at the tensioning lock (compare FIG. 2). This arresting occurs by means of a shifting or sliding sleeve 7 which is displaceably journalled upon the tensioning lock. In the arrested condition of the hook 1, the sliding or shifting sleeve 7 is shifted or pushed over the end of the lengthened or extended part of the hook 1. This end of the hook 1 has a profile configuration 15 upon which a correspondingly embodied part of the sliding sleeve 7 is latchable or arrestable. Since the sliding sleeve 7 is shiftable upon the tensioning lock, the profile formation 15 of the hook 1 must extend parallel or substantially parallel to the outer wall of the tensioning lock. The sliding sleeve 7 is journalled upon a pressure spring 9.

The quick unlatching occurs with arrangement of a sliding sleeve 7 merely by shifting or pushing back the same. The lengthened or extended part of the pivotable hook 1 is uncovered or released hereby, and the hook 1 pivots or swings downwardly, which also occurs under load. The chain 16 or the lashing point is uncovered or released therewith.

According to FIGS. 1 and 2, the fork connection 3 and the fork-shaped link member 3' on the end faces of a tensioning lock are arranged shiftably with respect to each other. The fork-shaped link member 3' makes possible a quick coarse shortening of the chain 16 by means of a locking or index bolt 12. As apparent from FIGS. 5 and 6, the locking or indexing bolt 12 is securely clampable in the fork-shaped link member 3' by preferably two balls 17 which are subject to a pressure spring tensioning. For each ball 17 there is provided a pressure spring 18, which is journalled in an externally accessible spring guide 20. The balls 17 escape or deflect in the direction of the spring guide 20 during corresponding counterpressure, and the thus deflected balls uncover or make free openings arranged for receiving the locking or indexing bolt 12 for introduction of the locking or indexing bolt 12 into the arms or legs of the fork-shaped link member 3' extending parallel to each other. The counterpressure effective upon the balls 17 is eliminated or reduced, the balls 17 are pressed out of the spring guide 20 with a part of the upper surface thereof by the pressure spring 18. This pressed-out part of the ball 17 locks or indexes in correspondingly provided recesses or depressions of the bolt 12. Expediently, a ball 17 which is subject to pressure spring tensioning is provided in each arm or leg of the fork-shaped link member 3', whereby in itself a sufficient securing of the bolt 12 is provided against unintended separation or falling out.

The balls 17 are pressed back in the direction of the spring guide 20 by corresponding tension upon the bolt 12. For this purpose, the tension or pulling effective on the bolt 12 must be greater than the spring force.

The spring guide 20 is arranged inclined, advantageously, by 45°, to the axis of the locking or indexing bolt 12. For easier introduction, the diameter of the locking or indexing bolt 12 is somewhat smaller than the diameter of the openings arranged for receiving the locking or indexing bolt 12, so that between the wall of the opening and the locking or indexing bolt 12 there is provided a play 14.

Figure 10:
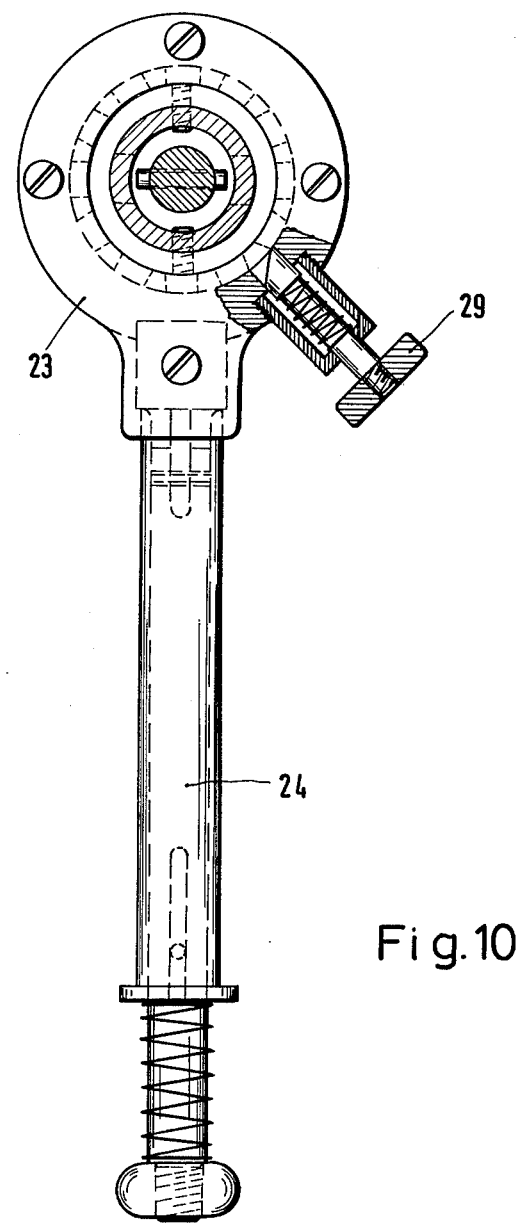
FIG. 10 is a vertical section through an installed ratchet.

The tensioning device illustrated in FIGS. 1 and 2 with the hand pipe 10 is, as already mentioned, suitable for small preloading forces up to approximately 4000 N. For greater preloading forces, the arrangement of a ratchet 23 is expedient. As recognizable in FIG. 8, the ratchet 23 is arranged centrally on the tensioning lock. For greater tensioning forces, previously it was conventional to use a toggle or crossbar insert or through-pin. Such inserts or through-pin crossbars in contrast to ratchets, however, can only be used when sufficient space is available for turning or rotation of the tensioning lock. The ratchet crossbar or toggle 24 is reversibly arranged, and has a non-illustrated embossing. With a projecting ratchet crossbar 24, there would exist the danger of injury or danger of stumbling. A detent or arresting means 29 serves for fixing the attained tensioning (FIG. 10).

The quick unlatching device arranged on one end face of the tensioning lock has a spring-loaded engagement piece 25 which is freely pivotable in all directions. A pressure spring 26 of the engagement piece 25 is guided on the one hand on a bolt stud 27 which is fastened on the end terminating plate 28 of the tensioning lock. On the side opposite to the bolt stud 27, the spring 26 is fastened in a recess in the engagement piece 25. On the other end face of the tensioning lock, there is arranged the already described fork-shaped link member 3'.

The present invention is, of course, in no way restricted to the specific disclosure of the specification and drawings, but also encompasses any modifications within the scope of the appended claims.

What we claim is:

1. A tensioning device that fulfills three functions including a coarse shortening of a chain, a tensioning thereof and a rapid opening thereof, especially for lashing chains having chain links in a chain strand of chain members, which comprises in combination: a housing, a double nut rotatably journalled over a part of the length thereof being protected in said housing, two link members for receiving chain links, at least one link member having a receiving opening in which at least substantially each chain member of the chain strand can be connected, said link members being movable relative to one another and having a releasable latch means including a securing member associated with the receiving opening of at least one link member with which a chain member located in the receiving opening is to be secured, said securing member being mounted at least partially yieldably shiftable in a released position as journalled on the tensioning device, at least one of said link members having a fork-like shape with two freely projecting legs which extend parallel to one another and are interconnected by a transverse piece, said link members being adapted to be held in a closure position under tension, with at least one link member, under the force of a connected tensioned chain, being adapted to be movable rapidly into a release position, two spindles with a left thread and a right thread journalled in said double nut so that said spindles simultaneously can be adjusted oppositely relative to each other with said double nut including both tensioning and coarse shortening therewith, without any additional auxiliary tools, and an actuating element rigidly connected upon said double nut for rotation of said double nut, said spindles projecting with ends thereof away from each other out of said double nut and being provided at these ends with a connection link member providing one receiving opening for the chain member.

2. A tensioning device in combination according to claim 1, which includes said double nut and said two spindles journalled in said double nut for movement of said link members, each of said spindles having a self-binding left and right thread.

3. A tensioning device in combination according to claim 2, which includes a pivotal hook, which serves as one of said link members and is adapted to form a suspension opening, and also includes a bracket adapted to bridge said suspension opening.

4. A tensioning device in combination according to claim 3, in which said hook has a free end releasably connectible to said bracket.

5. A tensioning device in combination according to claim 4, in which the shape of said hook is such that a lever arm is formed between the pivot point of said hook and the point of engagement of a chain in said hook.

6. A tensioning device in combination according to claim 5, which includes a fork connection having two freely projecting parallel legs, said hook being arranged between said legs.

7. A tensioning device in combination according to claim 6, in which said bracket comprises two parts respectively located in the plane of the legs of said fork connection.

8. A tensioning device in combination according to claim 7, in which said hook and said bracket are pivotally journalled about a common axis.

9. A tensioning device in combination according to claim 8, in which said hook and said bracket are adapted to form a ring in their closed condition.

10. A tensioning device in combination according to claim 7, in which said two legs of said fork connection are angled off at an upward incline to form said bracket and, as such, to bridge said suspension opening of said hook.

11. A tensioning device in combination according to claim 9, in which said hook is adapted to extend beyond the pivot axis thereof.

12. A tensioning device in combination according to claim 11, in which said hook extension is adapted to be arrested.

13. A tensioning device in combination according to claim 12, in which said hook extension terminates upon the outer wall of said tensioning device.

14. A tensioning device in combination according to claim 13, which includes a slide sleeve displaceably journalled thereon for arresting said hook extension.

15. A tensioning device in combination according to claim 14, which includes a pressure spring, said slide sleeve being journalled upon said pressure spring.

16. A tensioning device in combination according to claim 15, in which said slide sleeve, in the arrested condition of said hook, is adapted to be shifted over the end of said hook extension.

17. A tensioning device in combination according to claim 16, in which the end of said hook extension is provided with a profile over which a correspondingly embodied part of said slide sleeve is engageable.

18. A tensioning device in combination according to claim 1, in which said transverse piece is formed by a locking bolt which is securely clampable in said fork-like link member by at least one pressure tensioned ball.

19. A tensioning device in combination according to claim 1, which includes a centrally arranged ratchet which is simultaneously provided with a built-on shortening loop.

20. A tensioning device in combination according to claim 19, which includes a reversibly arranged ratchet crossbar.

21. A tensioning device in combination according to claim 19, which includes a spring loaded engagement piece which is associated with one of said link members.

22. A tensioning device in combination according to claim 21, in which said engagement piece is adapted to be guided freely movable in all directions.

23. A tensioning device in combination according to claim 22, which includes a bolt stud, a recess in said engagement piece, and a pressure spring, one side of which is guided on said bolt stud, and the other side of which is fastened in said recess.

24. A tensioning device in combination according to claim 23, which includes an end termination plate, said bolt stud being fastened on said termination plate.

25. A tensioning device, especially for lashing chains, which comprises two link members for receiving chain links, said link members being movable relative to one another and having a releasable latch, at least one of said link members having a fork-like shape with two freely projecting legs which extend parallel to one another and are interconnected by a transverse piece, said link members being adapted to be held in a closure position under tension, with at least one link member, under the force of a connected tensioned chain, being adapted to be movable into a release position, said transverse piece being formed by a locking bolt which is securely clampable in said fork-like link member by at least one pressure tensioned ball, and for each said ball there is included a spring guide which is accessible from the outside, and a pressure spring journalled in said spring guide.

26. A tensioning device according to claim 25, in which each of said spring guides is inclined by 45° to the axis of said locking bolt.

27. A tensioning device according to claim 26, which includes a bore in said link member for receiving said locking bolt, the diameter of said locking bolt being smaller than the diameter of said bore.

28. A tensioning device according to claim 27, in which each leg of said fork-like link member contains a ball which is subject to pressure-spring tensioning.

* * * * *